July 8, 1941.　　　W. O. LYTLE　　　2,248,714
METHOD OF TREATING COLORED GLASS SHEETS
Filed Dec. 18, 1937　　　3 Sheets-Sheet 1
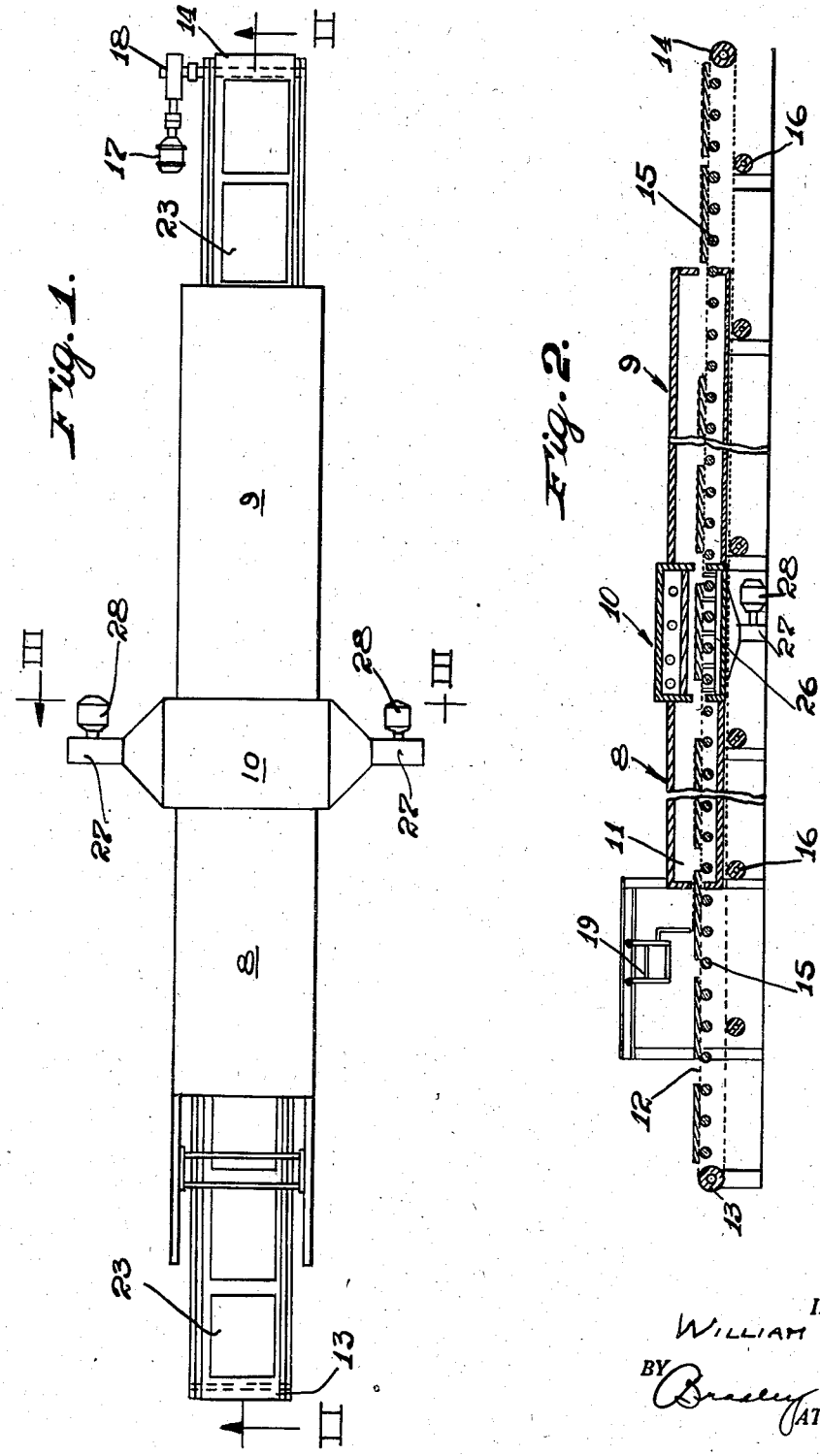
INVENTOR.
WILLIAM O. LYTLE
BY
ATTORNEYS.

July 8, 1941.  W. O. LYTLE  2,248,714
METHOD OF TREATING COLORED GLASS SHEETS
Filed Dec. 18, 1937  3 Sheets-Sheet 2
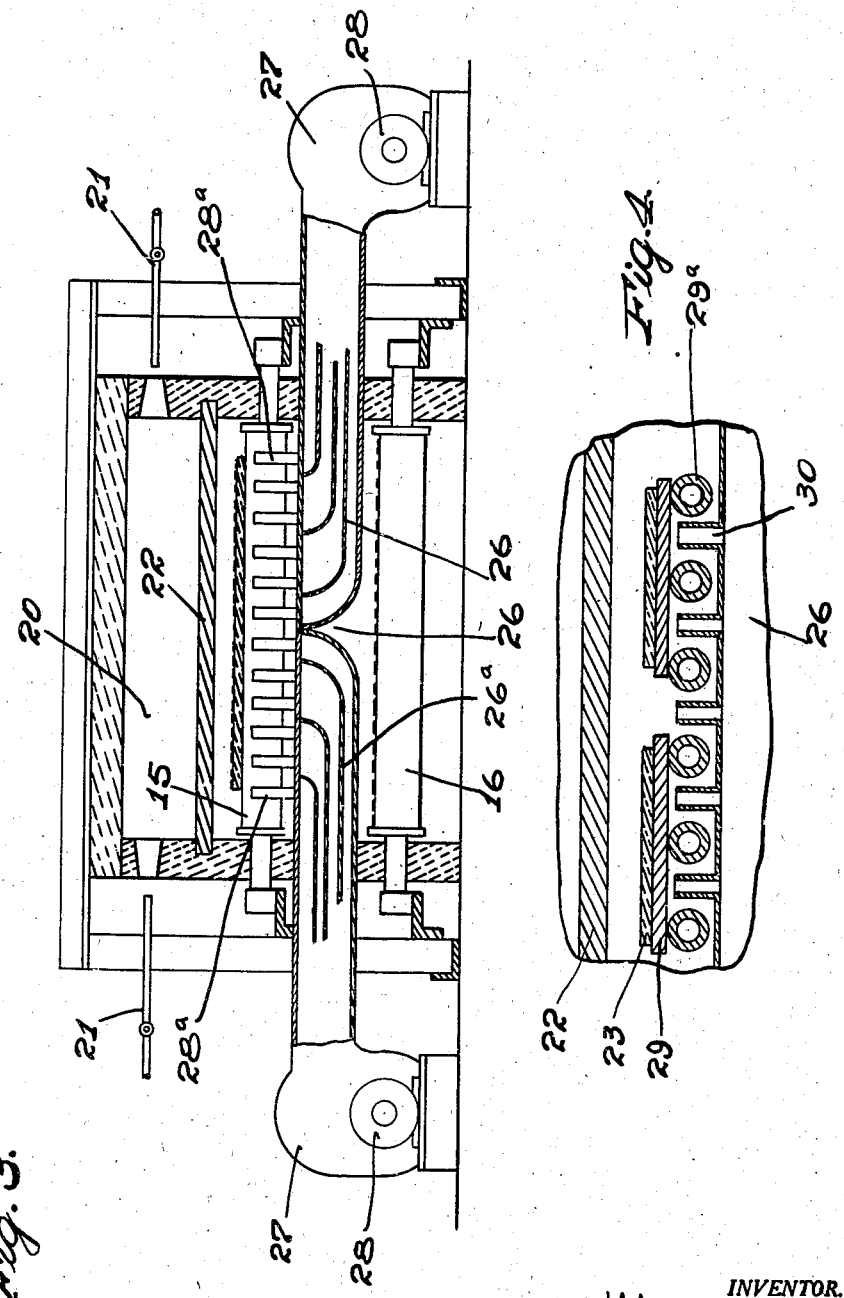
INVENTOR.
WILLIAM O. LYTLE
BY
ATTORNEYS.

July 8, 1941.  W. O. LYTLE  2,248,714
METHOD OF TREATING COLORED GLASS SHEETS
Filed Dec. 18, 1937  3 Sheets-Sheet 3
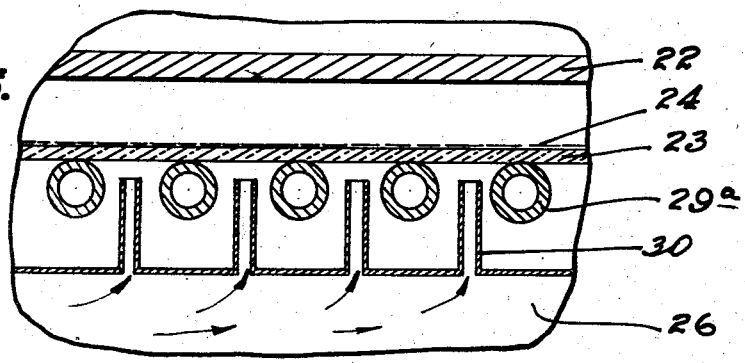
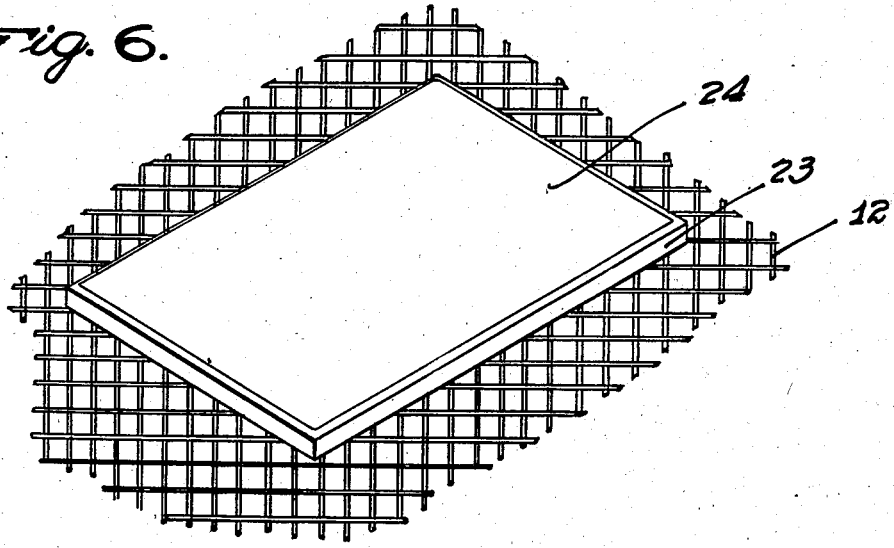
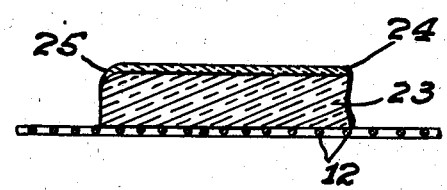
INVENTOR.
WILLIAM O. LYTLE
BY
ATTORNEYS.

Patented July 8, 1941

2,248,714

UNITED STATES PATENT OFFICE 2,248,714

METHOD OF TREATING COLORED GLASS SHEETS

William O. Lytle, New Kensington, Pa., assignor to Pittsburgh Plate Glass Company, Allegheny County, Pa., a corporation of Pennsylvania Application December 18, 1937, Serial No. 180,544

9 Claims. (Cl. 49—89)

The invention relates to a process and apparatus for treating colored glass sheets. One phase of the invention involves the treatment of glass plates, such as window or plate glass having a color film or coat of vitreous enamel thereon, in order to make such film durable and weather resistant. To secure these qualities, requires a heat treatment of 1500 deg. F. or upward, and one of the objects of the invention is the provision of a method and apparatus permitting of the high temperatures specified without marring or deformation of the plates. This requires the application of the high surface heat necessary to mature the enamel or to fuse a weathering type of enamel which will melt only at high temperatures without any corresponding increase in the temperature in the main body of the sheet.

The invention has for a further object the provision of a process and apparatus for giving the plates treated rounded corners, this being particularly desirable in the case of small size plates for use as wall tile. The plates, as cut from large sheets of glass, such as plate or window glass, have the sharp relatively rough edges characteristic of glass cracked into sections after scoring with a diamond or wheel, and the edges must ordinarily be ground square or rounded to make them suitable for wall facings. The present treatment rounds the edges by the application of heat, coincident with the maturing of the enameling, so that the relatively expensive step of grinding the edges is avoided.

Certain embodiments of the invention are illustrated in the accompanying drawings, wherein:

Figure 1 is a plan view of the apparatus. Fig. 2 is a section on the line II—II of Fig. 1. Fig. 3 is a transverse section on an enlarged scale on the line III—III of Fig. 1. Figs. 4 and 5 are fragmentary sections through modifications. And Figs. 6 and 7 are detail views of one of the plates treated, Fig. 6 being a perspective view and Fig. 7 an enlarged section through one edge of the plate.

Referring to the drawings, the tunnel kiln shown in Figs. 1 and 2 comprises an entrance section 8 and an outlet section 9 with an intermediate section 10, in which a high degree of heat is applied to secure the fusion of the colored layer to the body of the glass plate, as later described. The entrance and outlet sections 8 and 9 are heated by suitable burners 11 and the heat so regulated that the section 10 has a gradually increasing temperature from its inlet end to the section 10, while the outlet section 9 has a gradually decreasing temperature from the section 10 to the outlet of the kiln so that the plates treated are reduced to handling temperature by the time they emerge from the kiln, the annealing of the plates occurring in this portion of the kiln. Instead of annealing the glass sheets in section 9 by a gradually decreasing temperature, as above described, it is possible to case harden the sheets by exposing them to a quick chilling treatment. In order to carry the glass sheets through the kiln, a belt 12 is provided passing around the pulleys 13 and 14, the upper flight of the belt being supported upon the idler rolls 15, while the lower flight is supported upon the rolls 16. The belt 12 is preferably of woven wire construction, as indicated in Fig. 7, this being a type of belt well known in connection with bottle leers. The pulley 14 is driven from a motor 17 (Fig. 1) through the intermediary of the gear reducer 18 whose drive shaft extends through the pulley 15.

Mounted at the entrance end of the kiln is a feeder 19 for supplying a layer of finely divided coloring material to the glass sheets to be coated which are placed on the leer belt to the right of the feeder. Any type of feeder may be employed, one which is suitable and well known in the art being of the type in which the material passes from a hopper to a chute extending horizontally above the belt and gives a vibratory motion to promote the feed of the material through the chute. If desired, the colored material may be supplied at this point by suitable spraying means, the coloring material in this case being a pigment suspended in suitable vehicle. Preferably, this material is of vitreous character. If a colored frit is used and fed by the vibrating feeder, such frit is of the type which may have a fusing temperature of from 1000 to 1400 deg. F. so that in passing through the entrance section of the kiln, it may be melted so as to form a liquid coating by the time the plates reach the section 10, in which the intense heating of the surface of the plate is secured. It is also feasible to operate at lower temperatures in the section 8 so that the frit is not melted, but the glass is merely raised to a temperature such that it will not fracture when it enters the highly heated section 10.

The section 10 is provided with a muffle chamber 20 extending the length of the section and heated by means of the gas burners 21. The lower side of this chamber is closed by a refractory plate 22, which in the operation of the muffle becomes heated to incandescence so that as the glass plates pass therebeneath on the belt, the surface of the plate is heated to a temperature of upwards of 1500 deg. F. This temperature will mature the surface coating of colored material and fuse it into the surface of the glass plate so that it forms a permanent union therewith penetrating into the surface skin of the clear plate. A coating of this kind fused into the glass surface of the plate has high degree of durability and weathering qualities much superior to ordinary enamels which are merely adhered to the surface of a glass plate at temperatures of 1100 to 1300 deg. F. One of the plates 23 is shown in Fig. 7 with a colored coating 24 fused thereto. The high temperature to which the plate is exposed not only secures the advantages mentioned above, but also rounds off the corners of the plates, as indicated at 25. If the glass plates are to be used as tile, this rounding of the corners during the application of the colored coating involves a considerable saving as these corners would otherwise have to be rounded off by a grinding operation or the edges of the plates would have to be squared up by grinding. The present process, therefore, obviates any requirement for edge finishing in the production of tile for use as wall facings or the like.

The application of the high degree of heat to the upper faces of the glass sheets as above described would ordinarily cause a deformation of the body of the plate if means were not provided to counteract this action since the temperature to which the upper face of the plate is subjected is considerably above the softening point of the glass. In order to keep the body of the glass plates from deformation, and also to prevent marring of such surface, provision is made below the top flight of the belt in the section 10 for cooling the under sides of the plates as they pass along the openwork belt. This cooling means is preferably in the form of a box 26 (Fig. 3) coextensive in area with the section 10 and supplied with air from the blowers 27, 27 driven from the members 28, 28. Outlet nozzles 28a are distributed over the upper wall of the casing and discharge through the belt against the lower sides of the glass plates passing therealong, baffles 26a being employed in the box 10 to improve the distribution of air to the nozzles.

After the plates pass through the section 10, they are annealed in the section 9, as the burners 11 are so arranged as to give a gradually decreasing temperature from the section 10 to the outlet end of the kiln where the plates emerge at handling temperature.

Fig. 4 illustrates a modification, in which the wire belt 12 of the first type of construction is dispensed with and instead the glass plates 23 are each supported upon a plate 29 of refractory material, such as clay or heat resisting metal composition. In this case, it is necessary to drive the rolls 29a, which in this case serve to transport the plates 29 through the kiln. The provision for heating the upper faces of the glass sheets and cooling the lower sides thereof is the same as heretofore described, the nozzles 30 in this case, however, discharging against the supporting plates 29 instead of against the glass plates.

Fig. 5 illustrates another modification in which the supporting plates 29 of the Fig. 4 construction are dispensed with and the glass plates 23 are directly carried upon the driven rolls 29a, the nozzles 30 in this case discharging directly against the lower sides of the glass plates as in the construction of Figs. 1 to 3. It will be understood that the apparatus is capable of considerable modification for carrying out the process as above described for providing a high heat on the surfaces of the coated sheets and at the same time maintaining the bodies of the sheet at a relatively low temperature so that they will not deform or mar. The air blast means is subject to considerable modification and it is possible to substitute other means for providing the chilling action, such as radiant coolers in which a cooling liquid is applied. The openwork runway contributes to the effective application of the air, but it will be understood that other types of runway may be employed with the supporting parts cooled so that they in turn maintain the glass plates resting thereon at the proper temperature. Various other expedients may also be employed for heating the upper surfaces of the plates. The muffle shown and described with the incandescent plate 22 is desirable because it tends to give a uniform heat over the surface of the glass plates, but other types of heaters may be substituted in carrying out the process, such as electrical resistance elements, surface combustion plates and the like, the primary requirement being to give a very rapid and uniform heating to the upper faces of the glass plates. In operation, the conveyor belt is preferably driven in a continuous manner, but if desired, it may be driven intermittently so that the plates are held stationary for an interval in the section 10. This expedient will permit the use of a section 10 of less length than is the case if the conveyor is driven continuously. In order to facilitate the rapid heating of the surfaces of the plates in the section 10, the coating material may contain special heat absorbing materials. In some cases sufficient cooling may be secured on the lower side of the glass plate in section 10 by mere exposure to the atmosphere without recourse to the air blast or other special cooling devices, the space below the conveyor belt being in such case open to a free circulation of the outer air at this portion of the kiln.

While the invention is directed primarily to the application of a colored vitreous glaze to a sheet of transparent glass, the process and apparatus have a wider application. The coating may be of a non-vitreous character having a relatively high fusing point, such as certain of the metals commonly used for decorative purposes. It may also be of vitreous character, but without color, when it is desired to give a clear glass sheet certain qualities inherent in the coating material, but not present in the body of the sheet. The sheet may also be of non-transparent glass, such as opaque cellular glass, which it is desired to give a surface glaze, either clear or colored. The procedure may further be used when the cooling is in the form of a thin sheet of glass colored or otherwise, which it is desired to fuse to the main sheet. In such case, a colored or uncolored glaze mixed with a flux may be used between the sheets to secure their adhesion together at a lower temperature than would otherwise be the case.

What I claim is:

1. A method of treating a glass plate having a coating layer on one face, which consists in positioning the plate in horizontal position upon supporting means lying in the common plane with such face up, exposing the upper surface of the plate to a source of heat which brings it to a temperature well above the softening point thereof, and causes a fusion of said layer to the plate, and at the same time cooling the lower face of the plate to a temperature substantially below that of the upper face.

2. A method of treating a glass plate having a coating layer on one face, which consists in positioning the plate in horizontal position upon supporting means lying in the common plane with such face up, exposing the upper face of the plate to a source of heat which brings it to a temperature above the softening point thereof and causes a fusion of said layer to the plate, and at the same time cooling the lower face of the plate to prevent softening thereof, and then annealing the plate.

3. A method of treating a glass plate having a coating layer on one face, which consists in positioning the plate in horizontal position upon supporting means lying in the common plane with such face up, exposing the upper face of the plate to a source of heat which brings it to a temperature above the softening point thereof and causes a fusion of said layer to the plate, and at the same time providing a cooling flow of air below the lower side of said supporting means to prevent softening thereof, and then annealing the plates.

4. A method of treating a glass plate having a vitreous coloring layer on one face, which consists in supporting the plate in horizontal position upon openwork supporting means with said face up, exposing the upper face of the plate to a source of heat which brings it to a temperature above the softening point thereof and causes a fusion of said layer to the plate, and at the same time applying cooling atmosphere to the lower face of the plate, and then annealing the plate.

5. A method of treating a glass plate having a vitreous coloring layer on one face, which consists in supporting the plate in horizontal position on flat refractory supporting means with such face up, exposing the upper face of the plate to a source of heat which brings it to a temperature above the softening point thereof and causes a fusion of said layer to the plate, and at the same time applying a cooling medium to said supporting means so as to cool the lower face of the plate contacting therewith, and then annealing the plate.

6. A method of treating a glass plate having sharp corners, which consists in positioning it in horizontal position upon supporting means lying in a common plane, subjecting the upper face of the plate to a source of heat which brings it to a temperature above the softening point of the glass, so that the corners at the upper surface of the plate flow and round off while maintaining the body of the plate at a temperature below the softening point thereof and then cooling the plate.

7. A method of treating a glass plate having sharp corners, which consists in positioning it in horizontal position upon supporting means lying in a common plane, subjecting the upper face of the plate to a source of heat which brings it to a temperature above the softening point of the glass, so that the corners at the upper surface of the plate flow and round off, applying cooling means beneath the plate so the temperature of the body of the plate is maintained below the softening point thereof and then cooling the plate.

8. A method of treating a glass plate having sharp corners, and having a vitreous coloring layer on one face, which consists in positioning it in horizontal position upon supporting means lying in a common plane with said face up, subjecting the upper face of the plate to a source of heat which brings it to a temperature above the softening point thereof, so that the corners at the upper surface of the plate flow and round off and said layer is fused to the plate, while maintaining the body of the plate at a temperature below the softening point thereof and then cooling the plate.

9. A method of treating a glass plate having sharp corners and having a vitreous coloring layer on one face, which consists in positioning it in horizontal position upon supporting means lying in a common plane with said face up, subjecting the upper face of the plate to a source of heat which brings it to a temperature above the softening point thereof, so that the corners at the upper surface of the plate flow and round off and said layer is fused to the plate, applying cooling means beneath the plate so that the temperature of the body of the plate is maintained below the softening point thereof, and then annealing the plate.

WILLIAM O. LYTLE.